US012395781B2

(12) United States Patent
Whitaker et al.

(10) Patent No.: US 12,395,781 B2
(45) Date of Patent: Aug. 19, 2025

(54) BOLLARD SPEAKER WITH INGROUND SUBWOOFER

(71) Applicants: Joseph Whitaker, Las Vegas, NV (US); Michael Hopkins, Las Vegas, NV (US); Tyler Humphreys, Las Vegas, NV (US); Nick Berry, Las Vegas, NV (US)

(72) Inventors: Joseph Whitaker, Las Vegas, NV (US); Michael Hopkins, Las Vegas, NV (US); Tyler Humphreys, Las Vegas, NV (US); Nick Berry, Las Vegas, NV (US)

(73) Assignee: Origin Acoustics, LLC, Las Vegas, NV (US)

( * ) Notice: Subject to any disclaimer, the term of this patent is extended or adjusted under 35 U.S.C. 154(b) by 278 days.

(21) Appl. No.: 18/106,717

(22) Filed: Feb. 7, 2023

(65) Prior Publication Data

US 2024/0267671 A1 Aug. 8, 2024

(51) Int. Cl.

| | |
|---|---|
| ***H04R 1/24*** | (2006.01) |
| ***H04R 1/02*** | (2006.01) |
| ***H04R 1/34*** | (2006.01) |

(52) U.S. Cl.

CPC ............... *H04R 1/24* (2013.01); *H04R 1/028* (2013.01); *H04R 1/345* (2013.01)

(58) Field of Classification Search

CPC .......... H04R 1/24; H04R 1/028; H04R 1/345; H04R 1/023; H04R 2201/028; H04R 1/20;

(Continued)

(56) References Cited

U.S. PATENT DOCUMENTS

| | | | |
|---|---|---|---|
| 4,169,516 | A | 10/1979 | Honda et al. |
| 7,575,095 | B2 | 8/2009 | An et al. |

(Continued)

OTHER PUBLICATIONS

Screen capture from YouTube video clip entitled "Episode Landscape Series Burial Subwoofer by SnapAV," 1 page, uploaded on Mar. 22, 2016 by user "snap_one". Retrieved from the internet: <https://www.youtube.com/watch?v=cPgLiMOpfUQ> (Year: 2016).*

(Continued)

*Primary Examiner* — Fan S Tsang
*Assistant Examiner* — Sean M Rinehart
(74) *Attorney, Agent, or Firm* — Kirk A. Buhler; Buhler & Associates Patenting

(57) ABSTRACT

Improvements in a bollard speaker with in-ground subwoofer where the bollard contains a first speaker for higher frequencies and the subwoofer that provides lower frequencies that emit from below ground up through the bollard through a grill in the middle or upper portion of the bollard. The in-ground subwoofer provides a structural foundation for the bollard. Placing the subwoofer in an underground housing allows for larger speaker sizes for improved lower frequency response without trying to produce low frequency sounds in a constrained vertical bollard housing pole. The same base subwoofer is used with interchangeable bollards that accommodate both a cylindrical and a square or rectangular above ground bollard. The speaker within the bollard is configurable for omni-directional or directional sound transmission.

16 Claims, 5 Drawing Sheets

(58) Field of Classification Search
CPC .. H04R 1/30; H04R 2203/12; H04R 2400/11; H04R 1/025
USPC .......................................................... 381/186
See application file for complete search history.

(56) References Cited

U.S. PATENT DOCUMENTS

| | | | | |
|---|---|---|---|---|
| 8,873,788 | B1 * | 10/2014 | Coombs | H04R 1/2811 381/387 |
| 9,004,706 | B1 | 4/2015 | Banfield | |
| 9,936,283 | B2 * | 4/2018 | Combest | H04R 1/02 |
| 10,051,369 | B2 * | 8/2018 | Coombs | H04R 1/2849 |
| 10,433,041 | B2 | 10/2019 | Garrett et al. | |
| 10,966,016 | B2 | 3/2021 | Lee | |
| 11,122,348 | B2 | 9/2021 | D'Ascanio | |
| 2002/0118858 | A1 * | 8/2002 | White | H04R 1/345 381/387 |
| 2004/0118630 | A1 | 6/2004 | Harwood | |
| 2012/0201403 | A1 * | 8/2012 | Tan | H04R 1/323 381/182 |
| 2013/0058518 | A1 * | 3/2013 | Held | G10K 9/00 381/386 |
| 2014/0053441 | A1 | 2/2014 | Arons et al. | |

OTHER PUBLICATIONS

GSB In-Ground Subwoofer Installation Guide [online]. JBL Professional, 2022. [retrieved on Dec. 20, 2024]. Retrieved from the internet <URL: https://jblpro.com/fr/site_elements/gsb8-gsb12-installation-guide> (Year: 2022).*

EB103W658BN Owner's Manual [online]. Coastal Source, 2022 [retrieved on Dec. 20, 2024]. Retrieved from the internet <URL: https://content.abt.com/documents/152006/coastal-source-outdoor-speaker-EB103W658BN-owners-manual.pdf>. (Year: 2022).*

Outdoor Living Guide [online]. Coastal Source, 2017 [archived at web.archive.org on Nov. 1, 2020] [retrieved Dec. 20, 2024-]. Retrieved from theinternet <URL: https://web.archive.org/web/20201101003852/https://elevatedintegration.com/wp-content/uploads/2019/08/Coastal_Source_Outdoor_Living_Guide_2017.pdf> (Year: 2017).*

* cited by examiner

BOLLARD SPEAKER WITH INGROUND SUBWOOFER

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a bollard. More particularly, the present bollard provides a slender vertical post with an enlarged underground base that houses a subwoofer to provide improved lower frequency sound and also provides a structural foundation.

Description of Related Art Including Information Disclosed Under 37 CFR 1.97 and 1.98

Bollards are typically sturdy, short vertical posts that are used as a barrier or support. More modern bollards can include lighting, and or speakers. When a speak or speakers are installed, one limitation is the diameter of the vertical post that prevents good lower frequency sounds. Another issue is often even distribution of sound from all directions around the pole. A number of patents and or publications have been made to address these issues. Exemplary examples of patents and or publication that try to address this/these problem(s) are identified and discussed below.

U.S. Pat. No. 11,122,348 issued on Sep. 14, 2021, to Franco L. D'Ascanio et al., and is titled Outdoor Omni Bollard Speaker. This patent discloses an omni, bollard speaker has circular, cylindrical lower and upper housings. A domed driver is mounted within the top wall of the lower housing and a speaker is rotatably mounted in the internal space in the upper housing, between the top wall of the lower housing and the speaker cover of the upper housing. The speaker is rotatable from a first horizontal position directly over the domed driver to reflect wide dispersion acoustical output directly over the driver to disburse sound evenly within the listening area. While this patent is for a bollard speaker the lower frequency sound is limited by the size of the bollard.

U.S. Pat. No. 10,433,041 issued on Oct. 1, 2019, to James Garrett et al and is titled Outdoor Loudspeaker with integral Lighting. This patent discloses an outdoor loudspeaker that is weather resistant and includes environmental lighting is described. The lamp is mounted to a cap at the top of the loudspeaker. An audio driver is mounted below the lamp. The lighting circuitry and the audio circuitry is separate, e.g., separate conduits and wiring in the loudspeaker. At least part of the loudspeaker can be mounted underground and, in the case of a sub-woofer, the entire chamber can be mounted below ground. While this patent discloses that at least a part of the loudspeaker can be mounted underground the structure is not configured for a bollard pole.

U.S. Pat. No. 9,004,706 issued on Apr. 14, 2015, to James Banfield and is titled Outdoor Speaker and Illumination Tower. This patent discloses a combination speaker and lighting tower for use outdoors. The lighting tower has a base and a housing that includes at least one lamp. A rotatable coupler is used to mount a speaker unit on the tower, which allows the speaker unit to rotate in a horizontal plane. A stop is provided in the coupler to prevent the speaker unit from rotating a full 360 degrees. The lighting tower may be installed on a patio or anchored in the ground. While this patent is for a speaker tower that can be mounted to the ground it does not provide for an underground speaker.

Published US application 2004/0118630 was published on Jun. 24, 2004, to Ronald Paul Harwood and is titled Pole Speaker. This published application discloses a speaker assembly is provided for enclosure within a structural pole. The speaker assembly includes a sub-plate adapted to be affixed adjacent to an internal cavity formed in a fixed end of the structural pole. A speaker is mounted to the sub-plate and oriented such that acoustical vibrations provided by the speaker are directed toward an underlying support surface of the structural pole. A resonating chamber member is oriented within the structural pole internal cavity and has an open end mounted adjacent to the speaker. While this patent is for a speaker in the pole, it does not provide for an underground speaker.

What is needed is a bollard that provides even sound over the entire audible frequency range. The bollard speaker with in-ground subwoofer disclosed in this document provides the solution.

BRIEF SUMMARY OF THE INVENTION

It is an object of the bollard speaker with in-ground subwoofer to provide a slender vertical bollard configuration that can be used as a barrier or walkway column without compromising the sound quality: due to the limited slender diameter of the bollard full base or low frequency sound is not compromised when the subwoofer is installed below the slender bollard.

It is an object of the bollard speaker with in-ground subwoofer to provide the subwoofer in an area under the bollard. The sound box can be optimized to provide superior low frequency sounds that are moved through the bollard tube so the mid-high frequencies along with the lower frequencies appear to emit from essentially the same vertical position on the bollard column.

It is another object of the bollard speaker with in-ground subwoofer for the subwoofer housing to provide a foundation. When a bollard is installed, there is usually some foundation to prevent damage to the upright nature of the bollard. The foundation is sized based upon the expected side load to resist damage. Because the embodiment is this document uses a subterranean subwoofer the housing of the subwoofer provides a solid foundation as well as a base to install a replacement bollard if damaged.

It is another object of the bollard speaker with in-ground subwoofer to have a bollard that is configurable as a cylindrical or a rectangular/square column. The same base subwoofer is used with interchangeable bollards that accommodate both a cylindrical and a square or rectangular above ground bollard.

It is another object of the bollard speaker with in-ground subwoofer to include frequency or sound cross-overs, digital signal processing (DSP), amplification, audio and signal transformer. The bollard is powered by an external power source or at least speaker wires that drive the speaker elements. The underground housing of the subwoofer provides an envelope for connections and electronics.

It is another object of the bollard speaker with in-ground subwoofer for sound direction of the mid-treble speaker to be configurable for omni-directional or directional transmission. For some installations it is desirable to emit higher frequency sounds in all directions from the bollard and in other installations, such as walkways the sound can be directed towards a walkway.

It is another object of the bollard speaker with in-ground subwoofer. Placing the subwoofer in an underground housing allows for larger speaker sizes for improved lower frequency response without trying to produce low frequency sounds in a constrained vertical bollard housing pole.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
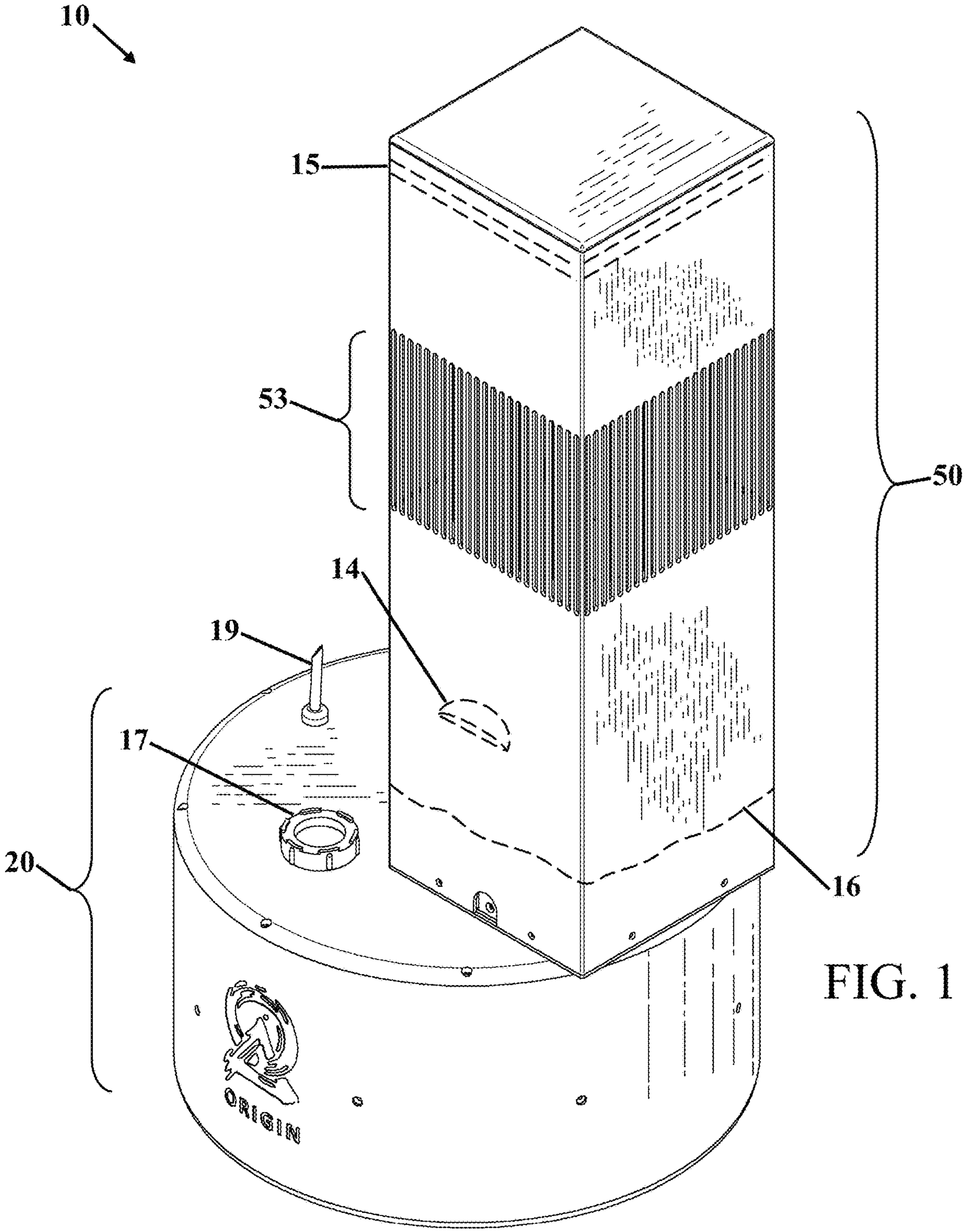
FIG. 1 shows a perspective view of a bollard speaker with in-ground subwoofer.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

Item Numbers and Description

| | |
|---|---|
| 10 bollard with subwoofer | 14 ground lighting |
| 15 crown lighting | 16 ground level |

-continued

Item Numbers and Description

| | |
|---|---|
| 17 cap | 18 transformer |
| 19 cable | 20 subwoofer housing |
| 21 subwoofer shell ring | 22 subwoofer shell bottom |
| 23 subwoofer shell top | 24 subwoofer mounting ring |
| 25 bollard seal | 26 directing ring |
| 27 bollard seal | 28 ring clamp |
| 29 bollard mounting flange | 30 subwoofer |
| 40 square shell snap adapter | 41 bollard port |
| 42 port lower cap | 43 inner grill |
| 44 port upper cap | 45 subwoofer dispersion cone |
| 46 tweeter | 50 bollard column |
| 51 tweeter bridge | 52 dispersion rubber |
| 53 sound opening | 54 directional cone |
| 55 resonance chamber | 60 mid-treble speaker |
| 71 upper speaker grill | 72 lower speaker grill mid |
| 80 round shell | 81 square shell |
| 90 sound from mid-treble | 95 out |
| 96 around | 97 up |
| 98 under | 99 out |

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

FIG. 1 shows a perspective view of a bollard speaker with in-ground subwoofer 10. The speaker system is configured with two components that include a subwoofer housing 20 that is configured for burying under ground level 16. A vent is capped 17 to allow for pressure venting from the subwoofer chamber for sound or air expansion. Within the subwoofer housing 20 is a subwoofer for lower frequency sounds that are ducted or ported up the bollard column 50. In the bollard column 50 is a separate at least one mid-treble speaker in the upper portion of the bollard column 50. In the preferred embodiment there are two separate speakers or sound producing elements, there could be three or more speakers. The are sound openings 53 that surround the bollard column 50 so sound can emit from the bollard column 50.

The bollard speaker with in-ground subwoofer 10 is connected to an external source through a cable 19 that could include data, power, communication power over ethernet (PoE) or a combination thereof. In some embodiments it is contemplated that one, some or all sides of the bollard can include lighting that is shown in the figure as crown lighting 15 band or ground lighting 14. It is further contemplated that the bollard could include a microphone and/or a camera(s) for communication or monitoring.

In the preferred embodiment the bollard column 50 has a height of about 30 inches but could be configured as a height of 6 to 60 inches. The above ground height of the bollard can also be adjusted by altering the burial depth of the subwoofer housing 20. While a square or rectangular bollard is shown in this figure, other embodiments in this application show the bollard in a round or cylindrical configuration. Shapes of the bollard are contemplated as round, oblong, rectangular or multi-sided. The above ground height of the sound openings 53 can also be adjusted or manufactured as desired without detracting from the novelty of the bollard speaker with in-ground subwoofer 10.

Figure 2:
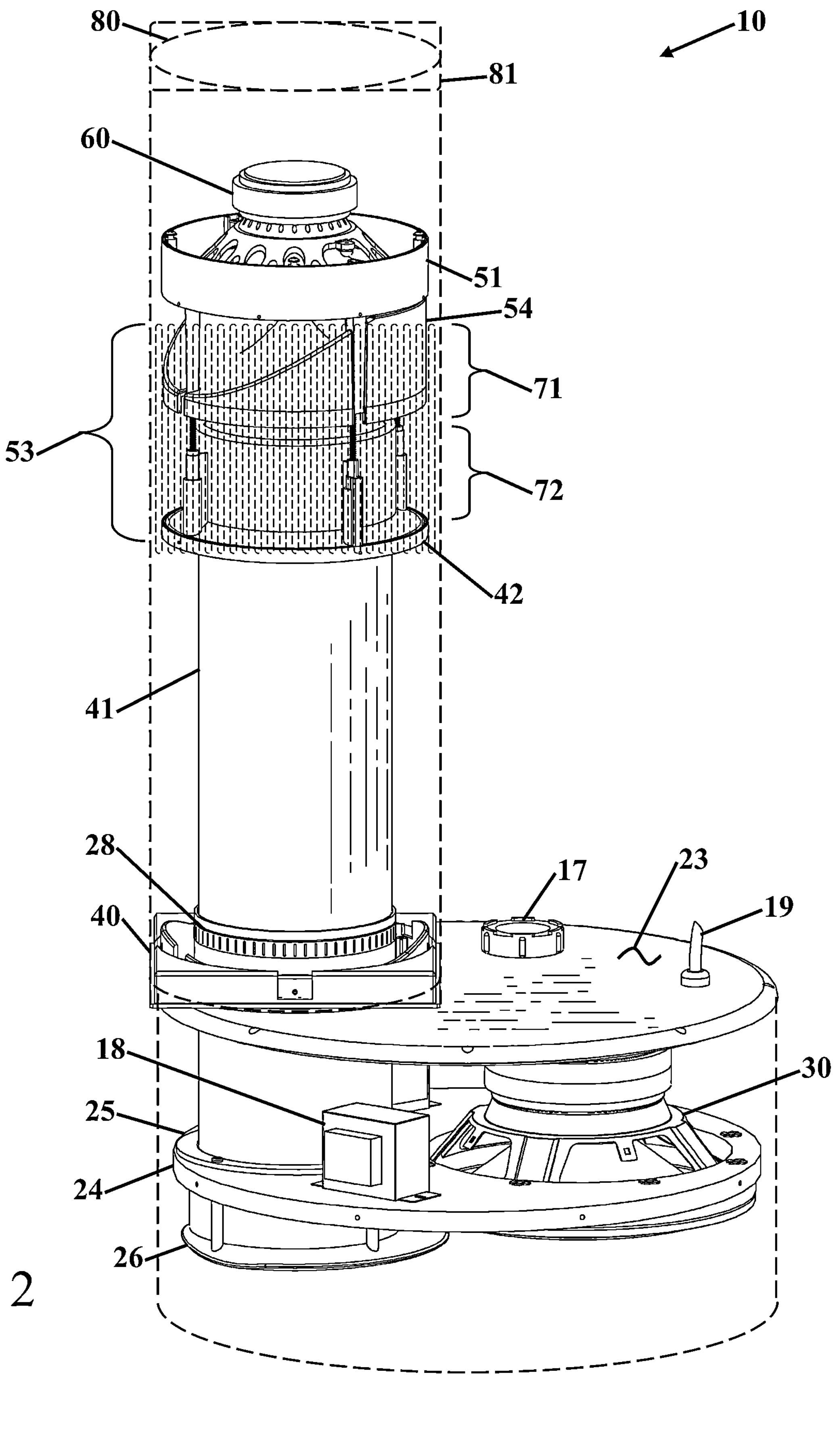
FIG. 2 shows a perspective view of the bollard speaker with in-ground subwoofer with some exterior components removed.
Figure 3:
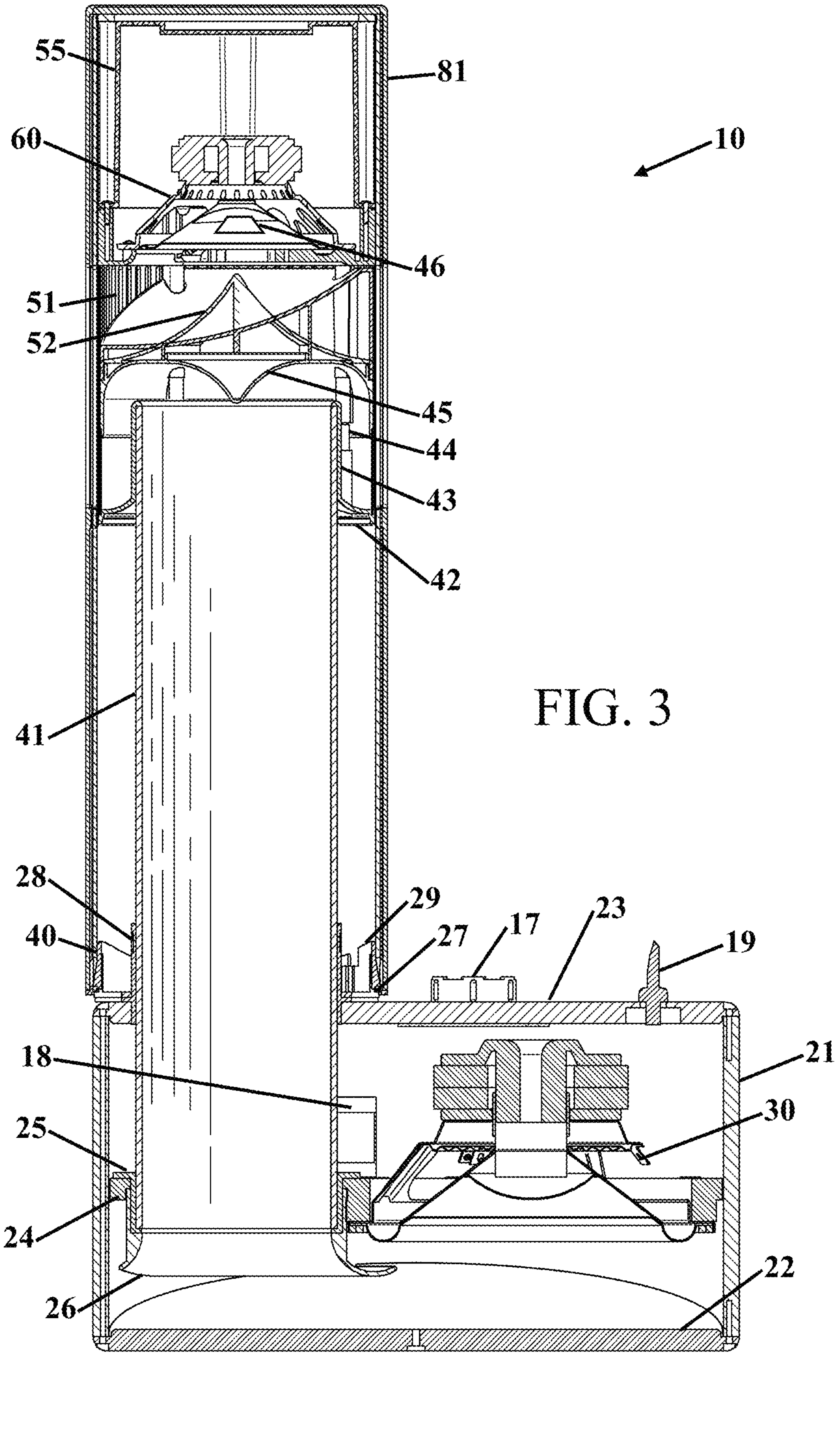
FIG. 3 shows a side cross-sectional view of the bollard speaker with in-ground subwoofer.

FIG. 2 shows a perspective view of the bollard speaker with in-ground subwoofer 10 with some exterior components removed for clarity of the internal components, and FIG. 3 shows a side cross-sectional view of the bollard speaker with in-ground subwoofer 10. Starting at the bottom of these figures, the housing of the subwoofer has a subwoofer shell bottom 22 that is secured and sealed to a subwoofer shell ring 21 and further covered with a subwoofer shell top 23. Within the subwoofer housing is a subwoofer mounting ring 24 where a subwoofer 30 is mounted. In the preferred embodiment, the subwoofer is a 10-inch subwoofer, but the subwoofer can be larger/smaller or include multiple subwoofers 30. It is contemplated that the subwoofer is 6 to 20 inches in diameter.

Above (or behind) the subwoofer the subwoofer housing is configured as a resonance chamber based upon the size, structure and acoustical properties of the subwoofer 30. A vent is capped 17 for balancing any pressure behind the woofer 30.

A cable 19 connects to the speaker, transformer 18 or other components within the assembly. The connections from the cable 19 can include frequency or sound crossovers, digital signal processing (DSP), amplification, audio and signal transformer to the speakers 30 and 60. Sound from the subwoofer 30 is emitted downward towards the bottom of the subwoofer housing 20 and the sound moves into a directing ring 26 that directs the sound up the bollard port 41. There is a bollard seal 25 that connects and seals the directing ring 26 in the bollard port 41.

The bollard port 41 passes from the subwoofer housing 20 out the top of the subwoofer housing 20 and is sealed with a ring clamp 28 around a bollard seal 27 and secured (clamped/sealed). This seals the subwoofer housing 20 from water, dirt, bugs, and contamination up to the height of the sound opening 53. There is a mounting flange 29 for a round shell 80. If the installation requires a square bollard a square shell snap adapter 40 is installed. For nearly all installations the subwoofer housing 20 and bollard port 41 is initially installed to grade before installation of the shell 80/81 and the bollard column 50 components.

At the top of the bollard port 41 is a port lower cap 42 that centers the bollard port 41 within the selected shell 80/81. There is also an inner grill 43 around the bollard port 41 within a port upper cap 44. Sound traveling up the bollard port 41 interacts with a subwoofer dispersion cone 45 that redirects the sound down around the sides of the bollard port 41 and out the sides of the shell 80/81 through the sound opening(s) 53 in the lower speaker grill 72.

After (or during) when the subwoofer housing 20 is sufficiently secured below ground, the upper portion or mid-treble speaker 60 sub assembly is installed after securing the subwoofer housing 20 or with the subwoofer housing 20. The bollard top has a separate speaker 60 installed to emit sound downward. In the preferred embodiment, the speaker 60 is a mid-treble speaker 60 of 6.5 inches in diameter, but other diameter speakers as well as multiple speakers of different diameters are contemplated based upon the desired sound and frequency response/sound profile. It is contemplated that the mid-treble speaker 60 of 6 inches in diameter is 2 to 10 inches in diameter. A higher frequency tweeter 46 may further be secured in proximity of the mid-treble speaker 60.

The configuration of the speakers prevents liquids (such as rain) from reaching the mid-treble speaker 60 and the subwoofer 30. The mid-treble speaker 60 is secured and suspended on a tweeter bridge 51 and fires downward into either a dispersion rubber 52 that sends sound in all directions through the sound sides of the shell 80/81 through the sound opening(s) 53 in the upper speaker grill 71 or into a directional cone 54 that sends the sound out 180 degrees, or other direction based upon the shape of the directional cone 54, and out the side(s) of the shell 80/81 through the sound opening(s) 53 in the upper speaker grill 71. The upper speaker grill 71 is stacked above the lower speaker grill 72 to provide two separate sound paths that audibly and visibly appear to emit from a single sound opening 53.

Figure 4:
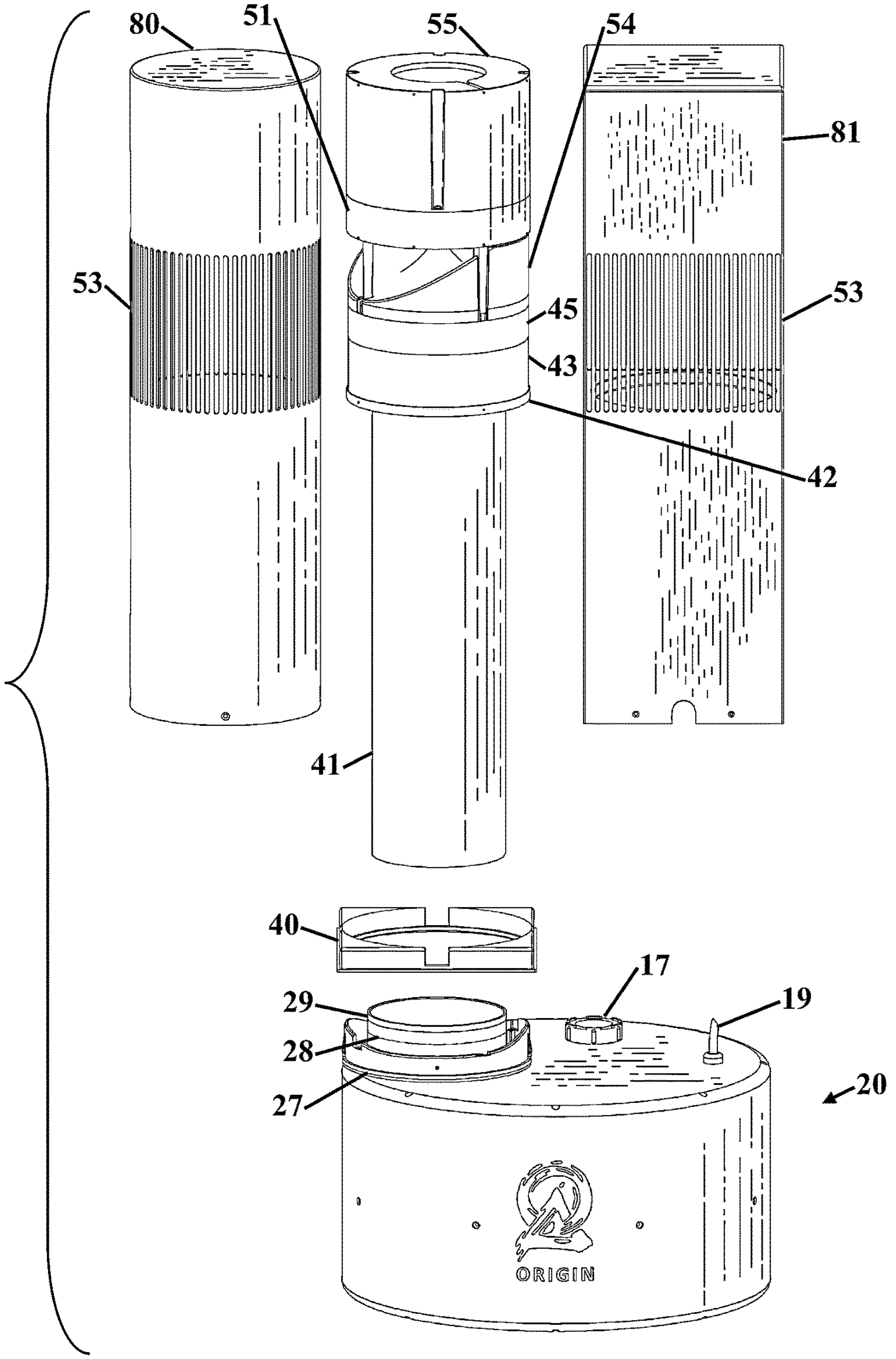
FIG. 4 shows an exploded view of the major components and options for the bollard speaker with in-ground subwoofer.

FIG. 4 shows an exploded view of the major components and options for the bollard speaker with in-ground subwoofer. The lower portion of this figure shows the subwoofer housing 20 with the separate bollard column. The round shell 80 option with the sound openings 53 is shown on one side of the bollard port 41 and square shell 81 option with sound openings 53 being shown on the other side of the bollard port 41.

The subwoofer housing 20 is shown with the connecting cable 19 and the vent cap 17. The sound opening of the subwoofer housing 20 has sealing components that are shown in this figure with the bollard seal 27, bollard mounting flange 29 and the ring clamp 28 that clamps and seals the bollard port 41 in the subwoofer housing 20. If the design requirement is for a square shell 81 the square shell snap adapter 40 is installed around the bollard seal 27.

At the top of the bollard port 41 is the port lower cap 42, the inner grill 43 and the subwoofer dispersion cone 45 where the lower frequencies traveling up the bollard port 41 from the subwoofer emit. Above the subwoofer dispersion cone 45 a 180-degree directional cone 54 for the mid-treble speaker is shown. Above and around the directional cone 54 is the tweeter bridge 51. While this is called a tweeter bridge 51 it is for supporting a speaker that emits higher frequency than the subwoofer in the subwoofer housing 20. The resonance chamber 55 and enclosure for the mid-treble or tweeter is on the top of the column. The resonance chamber both seals the top of the internal speaker(s) and provides a chamber that is sized to optimize sound from the higher frequency speaker therein.

Figures 5A, 5B:
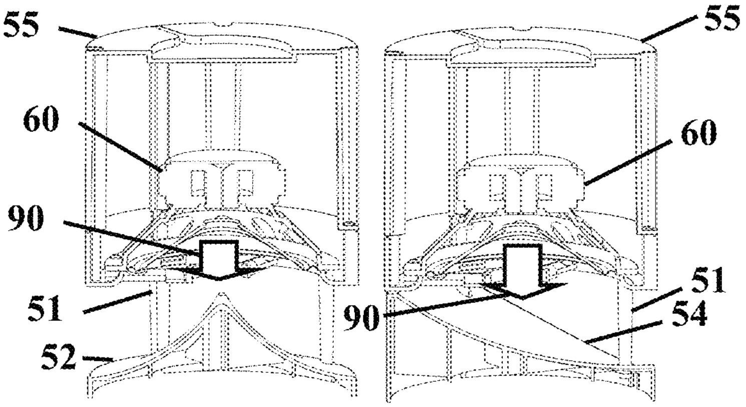
FIGS. 5A and 5B show sectional of the optional mid-treble speaker.

FIGS. 5A and 5B show sectional of the optional mid-treble speaker 60. In both embodiments the rear of the speaker 60 is in the resonance chamber 55. The speaker 60 is secured and displaced from sound directing device that sends sound either 360 degrees around the bollard or in a direction from the bollard on the tweeter bridge 51. The left image shows the speaker 60 emitting sound from the mid-treble 90 down towards the dispersion rubber 52 that sends sound is all directions out of the bollard. In the image to the right the directional cone 54 directs sound to a side of the bollard. The sound can be directed from 360 degrees to a narrow 90 degrees or smaller.

Figure 6:
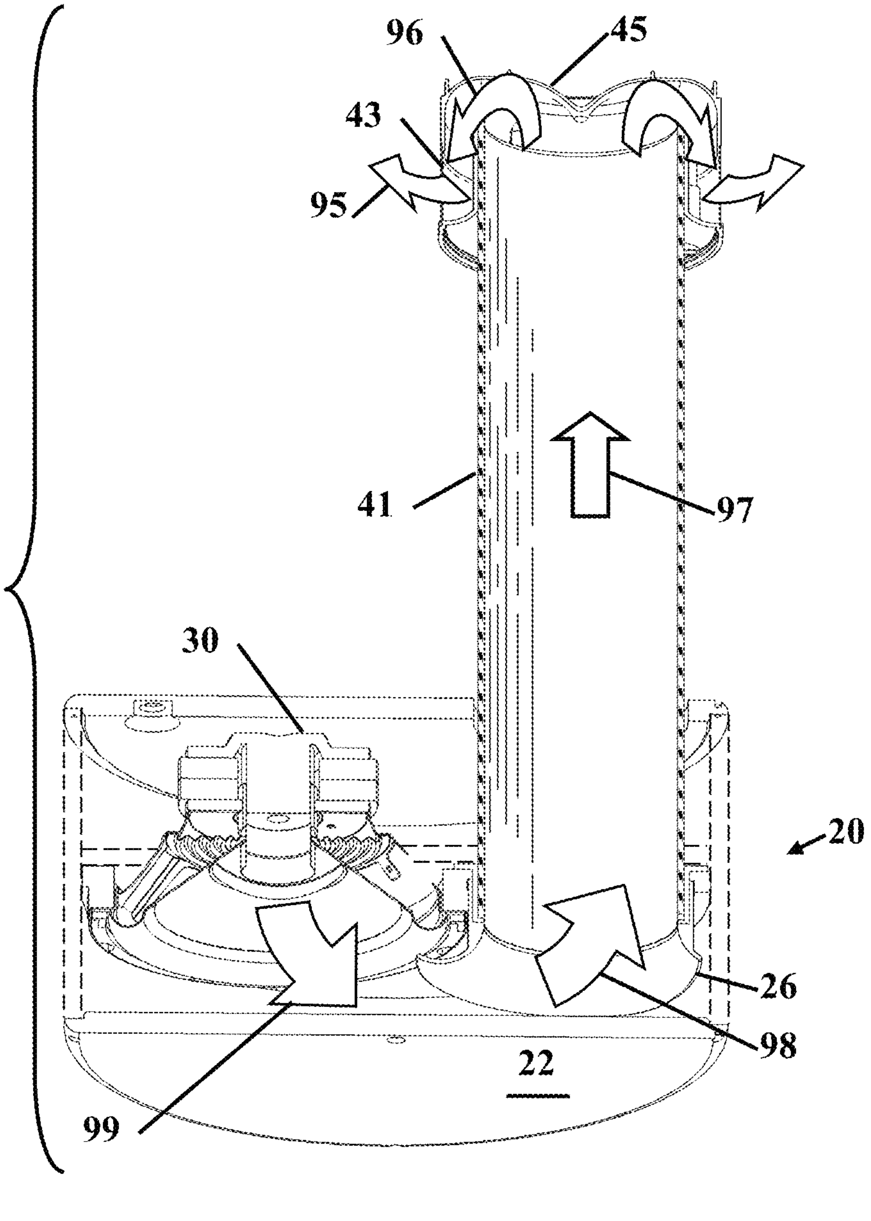
FIG. 6 shows a sectional view of sound movement from the sub-woofer of the bollard speaker with in-ground subwoofer.

FIG. 6 shows a sectional view of sound movement from the sub-woofer of the bollard speaker with in-ground subwoofer. The subwoofer housing 20 is shown cut-away to show the internal components and the direction of sound from the subwoofer 30. Lower frequency sound from the subwoofer 30 is directed out 99 of the subwoofer 30 into the bottom of the subwoofer housing 20. Sound bounces or is otherwise directed from the subwoofer shell bottom 22 and moves under 98 and into the directing ring 26. The low frequency sound then travels up 97 the bollard port 41. The sound then bounces, or is directed from the subwoofer dispersion cone 45, around 96 the dispersion cone 45 and through the inner grill 43 where the sound passes out 95 of the sound opening(s) 53 of the shell 80/81 (not shown in this figure).

The configuration of the subwoofer 30, or a first speaker and the mid-treble speaker or second speaker 60, are configured to send sound in opposing directions and emit sound from the bollard through a single sound opening 53. The sound can be co-mingled at the single sound opening 53 or emitted from stacked sound opening speaker grill 71 and 72

Thus, specific embodiments of a bollard speaker with in-ground subwoofer have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A bollard speaker with in-ground subwoofer comprising:

a bollard secured to a subterranean enclosure that encloses a first speaker;

said first speaker that emits sound downward into a shell bottom of said subterranean enclosure;

a directing ring at a bottom of a bollard port within said subterranean enclosure that is secured at a first end within said subterranean enclosure and at a second end in said bollard whereby sound reflected off of said shell bottom is directed into said directing ring;

said bollard includes a second speaker;

said first speaker is configured to produce low frequency sound;

said second speaker is configured to produce sound that is at a higher frequency than sound produced from said first speaker;

said first speaker is configured to produce sound in said subterranean enclosure and send sound up said bollard and out of said bollard;

said second speaker is configured to send sound from said bollard out of said bollard.

2. The bollard speaker with in-ground subwoofer according to claim 1, wherein said first speaker is 6 to 20 inches in diameter.

3. The bollard speaker with in-ground subwoofer according to claim 1, wherein said bollard port has a second end that directs sound from a subwoofer dispersion cone between said bollard port and said bollard.

4. The bollard speaker with in-ground subwoofer according to claim 3, wherein said subwoofer dispersion cone directs sound downward and out of a shell that extends around said bollard port.

5. The bollard speaker with in-ground subwoofer according to claim 1, wherein said second speaker is 2 to 10 inches in diameter.

6. The bollard speaker with in-ground subwoofer according to claim 1, wherein said bollard is configured for a height of between of 6 to 60 inches from ground level.

7. The bollard speaker with in-ground subwoofer according to claim 1, wherein said bollard is changeably mounted to said subterranean enclosure thereby said bollard is changeable from round, oblong, rectangular or multi-sided.

8. The bollard speaker with in-ground subwoofer according to claim 7, further includes at least one adapter that fits between a bollard port and said bollard.

9. The bollard speaker with in-ground subwoofer according to claim 1, wherein said second speaker is configured to emit sound downward into said bollard.

10. The bollard speaker with in-ground subwoofer according to claim 9, wherein said second speaker emits sound onto a dispersion cone that spreads sound 360 degrees around said bollard.

11. The bollard speaker with in-ground subwoofer according to claim 9, wherein said second speaker emits sound onto a directional cone that directs sound to less than 360 degrees around said bollard.

12. The bollard speaker with in-ground subwoofer according to claim 1, wherein there is at least a third speaker.

13. The bollard speaker with in-ground subwoofer according to claim 1, wherein there are at least two separate sound paths within said bollard.

14. The bollard speaker with in-ground subwoofer according to claim 13, wherein at least two separate sound paths travel in opposing directions from within said bollard.

15. The bollard speaker with in-ground subwoofer according to claim 1, wherein said bollard has at least one sound emitting opening located between said first speaker and said second speaker.

16. The bollard speaker with in-ground subwoofer according to claim 15, wherein said at least one sound emitting opening is configured to prevent falling water from entering within said bollard.

* * * * *